April 21, 1931.  A. P. PETRE  1,801,688
PACKING
Filed Aug. 30, 1930    2 Sheets-Sheet 1
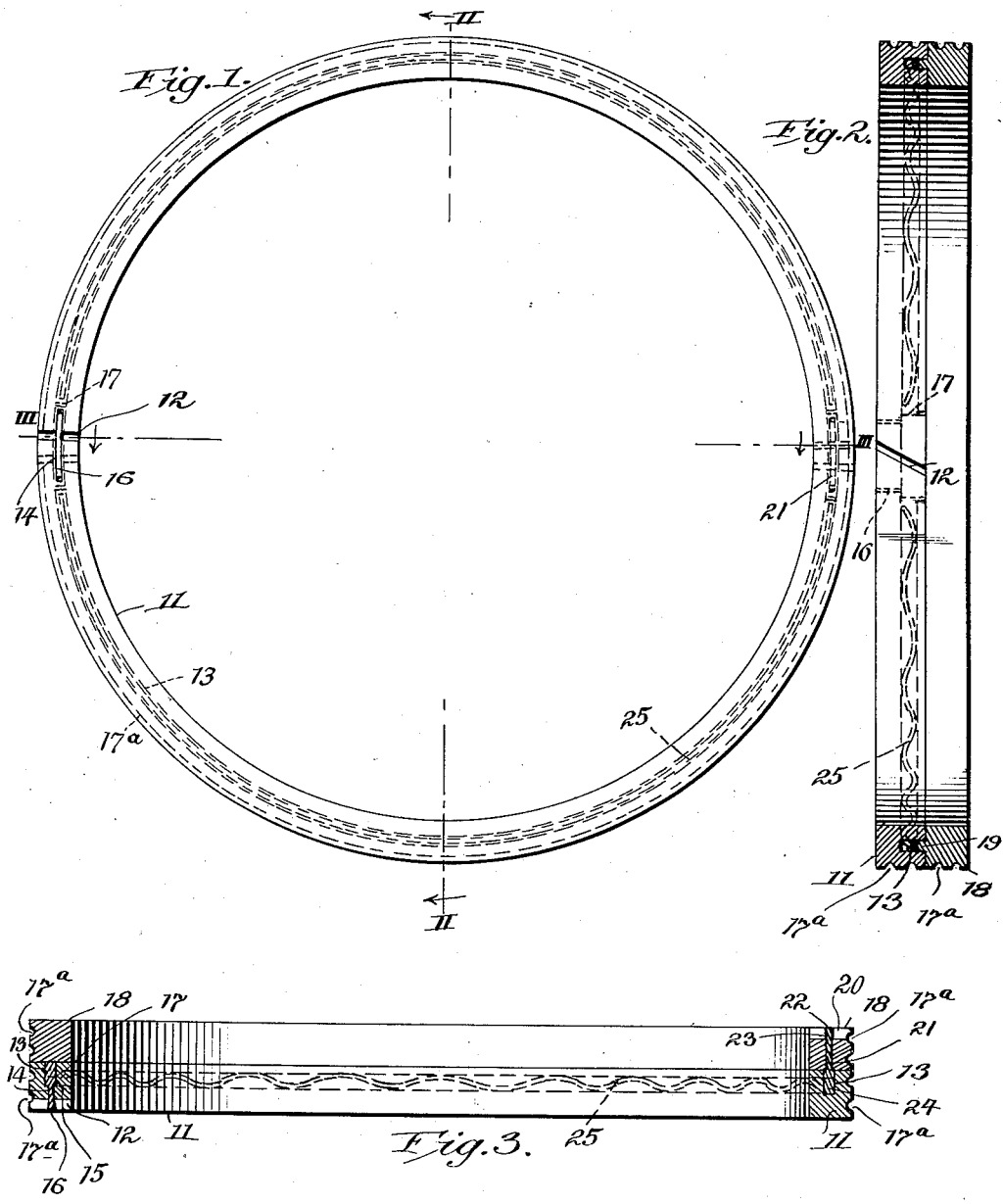

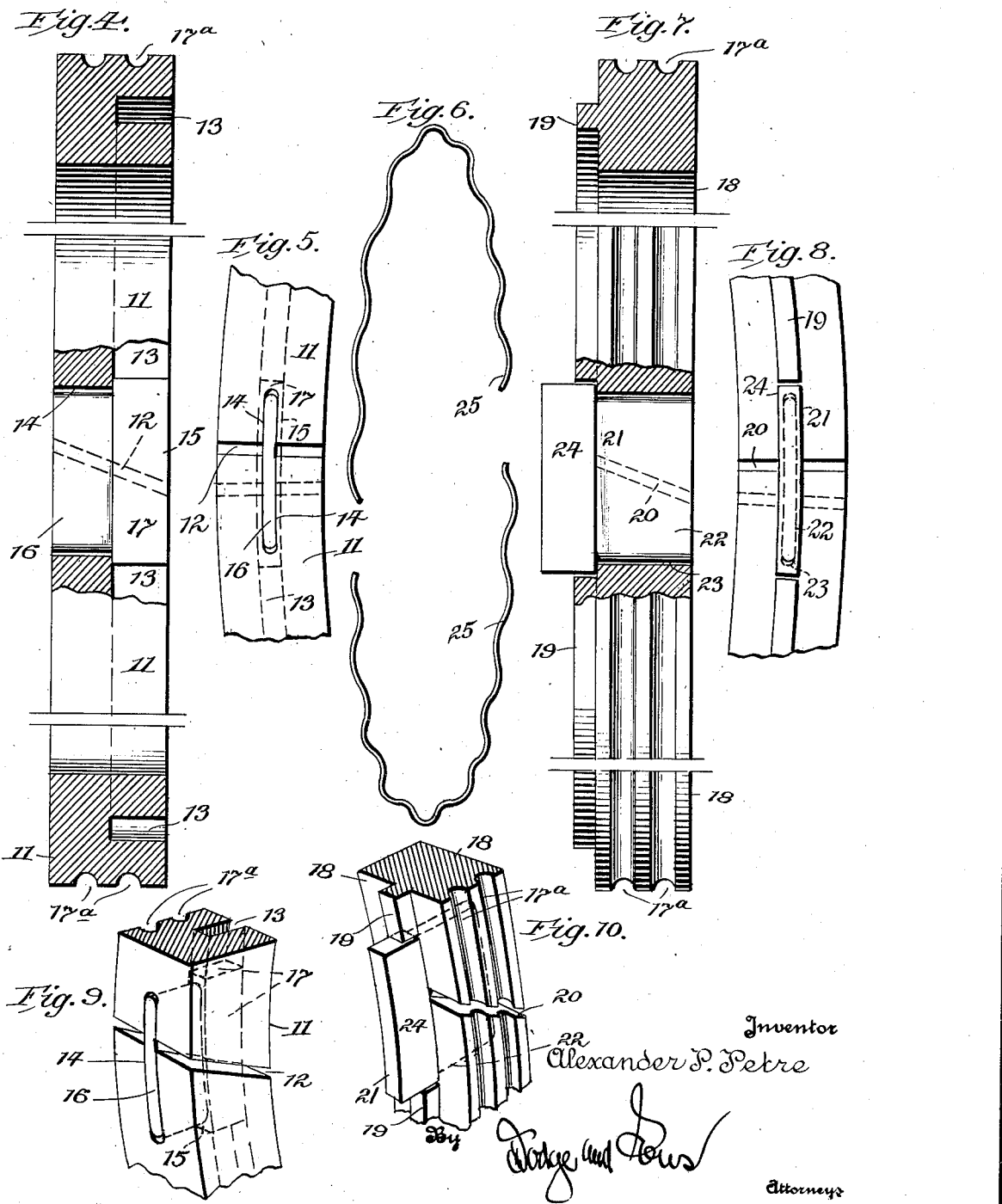

Patented Apr. 21, 1931

1,801,688

UNITED STATES PATENT OFFICE

ALEXANDER PRESTON PETRE, OF BALTIMORE, MARYLAND, ASSIGNOR TO THE AMERICAN HAMMERED PISTON RING COMPANY, OF BALTIMORE, MARYLAND, A CORPORATION OF MARYLAND

PACKING

Application filed August 30, 1930. Serial No. 479,052.

My invention relates to packings and particularly to packings adapted for use in steam engines.

In steam installations where no cylinder lubrication is provided and superheated steam is used, ring wear is very rapid and this wear is caused mainly by steam getting behind the rings and subjecting them to excessive outward pressure. In certain steam engines of the vertical type the pistons are provided with removable heads or followers which can be displaced for the installation, or adjustment of packings rings to compensate for this wear, at the same time restoring the cylinder seal.

My invention aims to produce a packing suitable for use under the conditions mentioned, and in which wear caused by excess pressure is reduced to a minimum. This result is obtained by providing a packing made up of two one-piece split rings which are consequently urged in an axial direction into leak-proof engagement with the sides of the packing groove. The two split rings are so provided with initial tension as to be urged outwardly into contact with the cylinder wall.

The axial pressure exerted by the rings against the sides of the ring grooves is so great that the rings are normally held rigid in the piston, and the piston thus acts as a plug piston. When, however, the piston head or follower is loosened the rings will expand radially to restore contact with the cylinder wall, which contact may have been partially destroyed by ring wear. This adjustment, of course, reduces leakage and is necessary only when leakage becomes excessive.

Other objects and aims of my invention will be particularly pointed out in the following description when read in conjunction with the accompanying drawings in which, Figure 1 is a plan view of one form of packing embodying my invention, the parts being shown in assembled relation, Figs. 2 and 3 are sections on line II—II and III—III, respectively, of Fig. 1, Fig. 4 is a sectional view of portions of the U-ring showing the joint-sealing tongue in elevation, Fig. 5 is a plan view of the joint-sealing tongue in place, Fig. 6 is a perspective view of one form of expander ring which may be employed to force the rings in an axial direction, Fig. 7 is a sectional view of portions of the T-ring showing the joint-sealing tongue in elevation, Fig. 8 is a plan view of the joint-sealing tongue in place, Figs. 9 and 10 are detail perspective views of the joint-sealing tongues as they appear, when in position in the respective rings.

Referring to the drawings, the improved packing is made up of two one-piece split rings 11 and 18, respectively. The ring 11, which is hereinafter designated the U-ring, as here shown, contains an angular split 12 to permit of radial expansion, and has in its upper face an annular groove 13.

Midway, or approximately so, between the inner and outer faces of the ring 11 is a slot 14 rounded at its ends and intersecting the split 12. This slot is adapted to receive a tongue 15 which covers the split in the ring to prevent leakage of steam through this split, and is also adapted to cooperate with the ring 18 to prevent relative rotation of these rings. The tongue 15 has a reduced portion 16 which fits into the slot 14 until its lower end is substantially flush with the lower face of the ring, while its upper portion 17 fits into and substantially fills the groove 13 throughout the area over which the tongue extends. This tongue has a radius of curvature the same as that of the two faces of the ring so as to conform to the curve of groove 13, and also of slot 14. The position which tongue 15 occupies is clearly shown in Figs. 4, 5, and 9, and from an examination of these figures it will be clear that this tongue will completely seal the split 12 up to the extent where the opening 12 due to wear of the cylinder contacting surface has become so great that the ring has passed its useful stage. As shown in the drawings, the ring 11 has a plurality of annular grooves 17$^a$ in its outer cylinder-engaging surface, these grooves functioning in a well known manner to improve the sealing action of the ring.

The ring 18 also contains outer grooves 17ª and is split at 20. This split intersects a slot 23 in the ring adapted to receive the reduced portion 22 of a tongue 21 which also has an enlarged portion 24 of a width which allows it to fit into the annular groove 13 in ring 11. As in the case of the tongue 15, the tongue 21 has a radius of curvature substantially the same as that of the ring. On one of its side faces ring 18 has an annular rib 19, substantially rectangular in cross section and adapted to fit into the annular groove 13 in U-ring 11. The rib 19, however, is of a height substantially less than the depth of the groove 13 and when the rings are placed in assembled relation the rib does not reach more than about one-half of the distance to the bottom of the groove. The rib 19 is also interrupted at two diametrically spaced points, one of the interruptions being at the point where the ring is split and extending for a substantial distance on either side of this split. At this point enlarged portion 24 of tongue 21, when in place, is coincident with and forms substantially a continuation of the rib 19 but extends therefrom for some distance axially so as to fit into and extend to the bottom of the groove 13 in U-ring 11 when the packing is assembled. Rib 19 is also interrupted at the opposite side of the ring to receive the enlarged portion 17 of the tongue 15 and to prevent the two rings from rotating, relatively. The position of tongue 21 is most clearly shown in Fig. 10.

The two rings 11 and 18 are expanded radially by inherent tension and this tension may be produced by cutting a piece from the circumference of the ring, or by hammering, or by any other well known method of expanding piston rings. When the packing is assembled, two sinuous expander springs 25 are placed in the groove 13, these two springs being oppositely placed as shown in Fig. 6, with their opposing ends separated by the enlarged portion 17 of tongue 15 and the enlarged portion 24 of tongue 21. The expander springs are corrugated in a vertical plane so as to subject the two rings to an axial stress but to exert no appreciable radial stress. In practice it has been found preferable to make the springs 25 of a vertical height substantially equal to the depth of the annular groove 13 in the U-ring. With this arrangement, the two rings are subjected to axial stresses when they are assembled and installed in the ring groove of the piston with the piston head as follower drawn into position, and therefore, permit a substantial axial adjustment when such adjustment is necessitated by wearing of the rings.

It has been found preferable, when this packing is used in connection with a vertical type engine having a removable piston head or follower, to place the U-ring in the bottom of the groove with the groove 13 on top. In making the assembly, the piston head or follower is first removed and then this U-ring is placed in position against the bottom of the groove, the tongue 15 then being inserted in its slot with the portion 17 projecting upwardly. The expander springs 25 are placed in groove 13, one on either side of the portion 17 of tongue 15. The T-ring 18 is then placed in position with the rib 19 entering the groove 13 and contacting with the expander springs 25, the sealing tongue 21 having first been placed in position in the slot 23 with its enlarged portion 24 projecting downwardly. The follower or piston head is then placed on top of the packing and drawn down, thereby forcing rib 19 into groove 13 against the expanding action of springs 25 and tending to compress the corrugations of these springs.

When thus assembled the two rings 11 and 18 will contact accurately with the cylinder walls because of their radial expansion, and will act as one piston ring during movement of the piston in the cylinder because they are prevented from relative rotation by the engagement of the free ends of rib 19 with the enlarged portion 17 of tongue 15, and from axial expansion by the engagement of the sides of the ring with lands of the piston groove and follower or piston head groove. The radial tension of these rings will be unaffected by the steam pressure, because the tongues 15 and 21 completely seal the joints and prevent steam from getting behind the rings in the usual manner. With the parts assembled, as above described, the corrugated expander springs 25 will exert considerable axial pressure against the bottom of the groove 13, and also against the face of rib 19 thereby causing the packing made up of the two rings to function as a unit, and in a manner much similar to that of the ordinary bull or solid ring frequently used in engines of this character.

Inasmuch as the packing is subjected to no additional radial stresses caused by steam getting behind the rings, the wear on the packing will be limited to the natural wear caused by the inherent tension of these rings. When a loss of power in the engine indicates that some ring wear has taken place which may not have been taken up by the radial expansion of the ring, the piston head or follower is loosened up to free the rings 11 and 18 and allow them to expand into contact with the cylinder wall, this radial expanding action being somewhat restrained when the piston head is locked in place. After this adjustment has taken place the piston head is again locked in position and the piston again functions as before until subsequent wear or binding of the ring in the groove makes further adjustment desirable.

It will be clear that the structure of this packing not only materially reduces the wear incident to normal operation, but will provide for ready adjustment after wear has taken place. The embodiment herein shown and described is not only of particular advantage in engines which are used without lubrication, but also when used with engines which are provided with lubrication. In the latter case, the annular grooves 17ª function to collect the oil and distribute it over the cylinder walls in a uniform and well understood manner. My packing is also of very great efficiency in that it allows for simple and adequate adjustment to compensate for wear and renders unnecessary the frequent replacement of packings which have been incident to the use of packings heretofore known in the prior art.

Although I have herein shown and described only one form of packing embodying my invention, it will be obvious that various changes may be made in the details, within the scope of the appended claims, without departing from the spirit and scope of my invention.

What is claimed is:—

1. A piston packing comprising a pair of split one-piece rings, one of U and the other of T section; means associated with each of the splits for preventing the escape of fluid therethrough one of said means also preventing relative rotation of the rings; and at least one sinuous expander carried in the groove of the U-ring for exerting axial pressure against the two rings and tending to force them apart.

2. A piston packing comprising a U ring and a T ring adapted to be assembled in interengaging relation, and both the said rings being radially resilient; means for preventing relative rotation of said rings; and sinuous expanders within the groove of the U-ring and tending to force said rings axially apart.

3. A piston packing comprising a first resilient split ring having a groove in one flat face; a second resilient split ring having a rib adapted to enter the groove in the first ring when the rings are assembled; sinuous expanders in the groove of the first ring and contacting with the rib of the second ring so as to tend to force said rings axially away from each other; and a tongue in one of said rings registering with the split to prevent the escape of fluid through the split, and engaging the other ring to prevent relative rotation of said rings.

4. A piston packing comprising a pair of resilient split rings each having an axial slot at the split; an annular groove in one of said rings and a discontinuous rib in the other of said rings, said rib being adapted to enter said groove when the packing is assembled; a tongue member in the slot in the grooved ring for sealing said split, and having a portion engaging the rib of the ribbed ring to prevent relative rotation of said rings; a second tongue in the slot of the ribbed ring to seal the split in said ring; and means carried by one of said rings for forcing said rings axially apart.

5. A piston packing comprising a pair of resilient split rings, one being of U and the other of T section, said rings being adapted for assembly with the rib of the T-ring in registry with the groove in the U-ring; sinuous expanders seated in the groove of the U-ring, and engaging the rib of the T-ring to force said rings axially apart; and a pair of arcuate tongues, one for each of said rings for sealing the splits in said rings.

In testimony whereof I have signed my name to this specification.

ALEXANDER PRESTON PETRE.